(No Model.)
G. H. JOHNSON.
POST HOLE DIGGER.
No. 370,482. Patented Sept. 27, 1887.
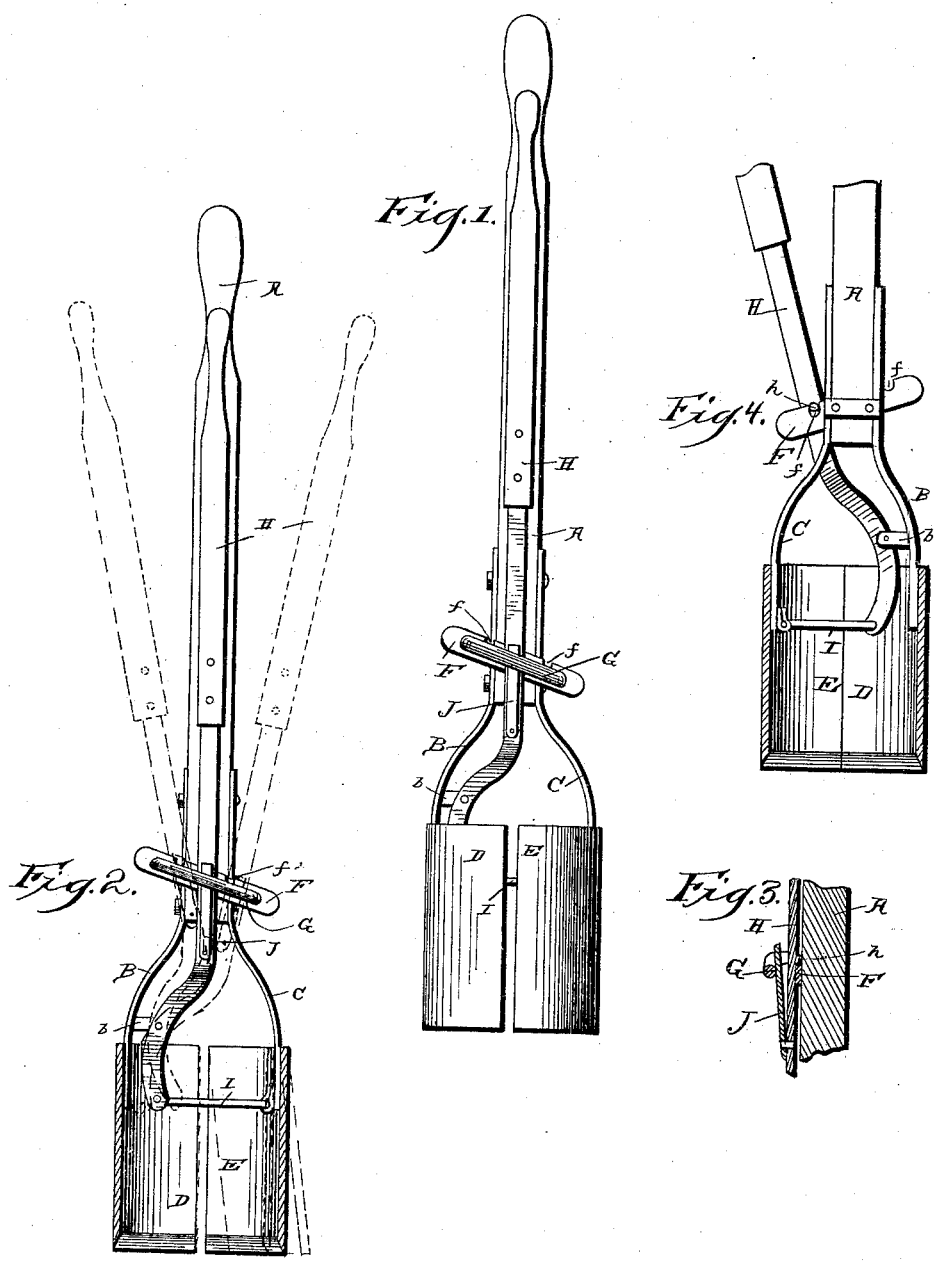
WITNESSES
Henry G. Dieterich
R. W. Bishop.
INVENTOR
Geo. H. Johnson
by C. A. Snow & Co.
Attorneys

UNITED STATES PATENT OFFICE.

GEORGE H. JOHNSON, OF SALISBURY FURNACE, VIRGINIA.

POST-HOLE DIGGER.

SPECIFICATION forming part of Letters Patent No. 370,482, dated September 27, 1887.

Application filed May 5, 1887. Serial No. 237,246. (No model.)

*To all whom it may concern:*

Be it known that I, GEORGE H. JOHNSON, a citizen of the United States, residing at Salisbury Furnace, in the county of Botetourt and State of Virginia, have invented a new and useful Improvement in Post-Hole Diggers, of which the following is a specification.

My invention relates to improvements in post-hole diggers, and its object is to provide a post-hole digger with means whereby the blades can be held together when the device is being lifted and held apart when being driven into the earth against the action thereof, as will be hereinafter first fully described, and then pointed out in the claims.

In the accompanying drawings, which fully illustrate my invention, Figure 1 is a side elevation of my improved device. Fig. 2 is a similar view, with the spades in vertical section and the motion of the parts indicated in dotted lines. Fig. 3 is a detail vertical longitudinal section. Fig. 4 is a vertical section opposite to Fig. 2.

Referring to the drawings by letter, A designates an operating-handle having the diverging arms B C secured to its lower end. The arm C is a spring-arm, while the arm B may or may not be a spring-arm. The semi-cylindrical blades D E are secured to the lower ends of the arms B C, and are carried thereby.

Near the lower end of the handle A, I secure the transverse inclined bar F, provided with a series of notches, $f$, in its upper edge. A bail or keeper, G, is secured to and projects from this bar F and extends the entire length thereof.

H is a lever which extends through this bail G, and serves to open and close the spades. The upper or handle portion of this lever extends up alongside the handle A, and may extend entirely to the upper end of the said handle, or not quite thereto, to suit the tastes of the users. The lower portion of this lever is made of spring metal, and below the bail G it is bent in toward the arm B and pivoted to a lug, $b$, on the inner side of said arm just above the upper edge of the spades. Below this lug the lower end of the lever is turned slightly toward the center, and its extremity is connected by a link, I, to the spade E, carried by the arm C. It will thus be seen that this lever H is connected to both of the spades, and the spades will be moved to and from each other, accordingly as the said lever is moved to one or the other side of the handle A.

The lever H is provided with a lug or stop, $h$, on its inner or rear side, which projects on a line with the upper edge of the bar F, and is adapted to engage the notches $f$ therein. On the outer side of the lever H, below the bail G, I secure the leaf-spring J, the upper free end of which bears against the inner side of the bail G. This spring serves to hold the stop $h$ in engagement with the notches $f$ of the bar F.

In operation the device is forced down into the ground by means of the handle A in the position shown in Fig. 1. After the spades have been driven to the desired depth the lever H is bent slightly away from the handle A to release the stop $h$ from engagement with the notched bar F, and the lever is then turned toward the lower end of the said bar, where the stop $h$ will be forced into engagement therewith by the spring J. This action causes the blades to close around and against the earth between them, and the same is then withdrawn by lifting the device from the hole. The dirt is released and dumped at any desired point by simply moving the lever H in the direction reverse to that in which it was moved to compress the spades against the dirt, as will be readily understood.

Having thus described my invention, what I claim, and desire to secure by Letters Patent, is—

1. The combination of the handle A, the spades D E, connected to the lower end thereof, the notched bar F and bail G, secured to the handle near its lower end, and the lever H, passing through the bail and provided with a stop which engages the notched bar, the said lever being connected to the spades to open and close the same, substantially as set forth.

2. In combination with the handle A, having the spring-arms B at the lower end, and the two semi-cylindrical spades attached to the arms B, the operating-lever fulcrumed to the handle and connected to one of the spades, and a ratchet-connection to hold the lever in its adjustments.

In testimony that I claim the foregoing as my own I have hereto affixed my signature in presence of two witnesses.

GEORGE H. JOHNSON.

Witnesses:
P. G. FELLERS,
TURNER McDOWELL.